2,804,480

SEPARATION OF HYDROXYLATED ARYL COMPOUNDS

Robert W. Martin, Lenox, Mass., assignor to General Electric Company, a corporation of New York No Drawing. Application December 12, 1951, Serial No. 261,390

6 Claims. (Cl. 260—619)

This invention is concerned with a process of separating in substantially pure form various hydroxy aryl compounds. More particularly, the invention is concerned with a process for separating in substantially pure state a hydroxylated aryl compound corresponding to the general formula: ROH where R is a member selected from the class consisting of aryl, alkaryl, arylalkylaryl, hydroxyalkyl aryl, poly (hydroxyalkyl) aryl, and hydroxyaryl radicals, etc., which process comprises (1) effecting reaction between a composition containing the above-described hydroxy aryl compound as an essential ingredient with a chlorosilane corresponding to the general formula: R'$_3$SiCl where R' is a lower alkyl radical, said reaction being conducted in the presence of a hydrogen chloride acceptor, (2) removing the formed hydrogen chloride salt, and (3) hydrolyzing the silicon reaction product to obtain a substantially pure hydroxy aryl derivative.

Great difficulty in the past has been experienced in isolating various organic compounds containing a hydroxyl group attached directly to a cycloorganic radical, for instance, an aromatic hydroxyl group. Thus, various pharmaceuticals such as sterols (cholesterol, ergosterol, etc.), pregnanediol, oestrone, etc., which comprise polycyclic alcohols have been difficult to separate in pure state because of the sensitivity of these materials to heat whereby they may be caused to convert to undesirable by-products. In addition, it has been difficult, to separate various phenolic materials to obtain individual compositions in an essentially pure, uncontaminated state because of the fact that prior methods for such separation have always led to contamination and coloring of the by-product.

I have now discovered a method whereby various hydroxy organic compounds of the class described above may be effectively separated from compositions containing the same or from contaminants in combination therewith in substantially pure state and in good yields without contamination by undesirable by-products or without coloring of the desired material. In accordance with my process, I effect reaction between the hydroxy organic compound (so designated for brevity) for instance, an hydroxy aryl compound described above, with a chlorotrialkyl silane in which the alkyl group is a lower alkyl group, for example, methyl, ethyl, propyl, isopropyl, butyl, isobutyl, etc., radicals. This reaction between the ingredients is conducted in the presence of a hydrogen chloride acceptor, for example, pyridine, quinoline, tertiary amines, for instance, triethyl amine, trimethyl amine, tributyl amine, tripropyl amine, etc. The hydrogen chloride salt resulting from the reaction between the hydrochloride acceptor and the liberated hydrogen chloride is then removed from the reaction product and the remaining product may then be fractionally distilled to give the trialkylsilyl derivative of the desired hydroxy organic compound. The latter derivative may be hydrolyzed to give the substantially pure hydroxy organic, e. g., hydroxy aryl compound, with the trialkylsilyl portion being recovered as either the silicol (e. g., trimethyl silicol) or as the disiloxane, neither one of which interferes with the purification of the hydroxy compounds.

By means of my process, various hydroxy organic compounds, for instance, various hydroxy aryl compounds corresponding to the general formula: ROH may be obtained where R is a member of the class described above. Thus, R may be aryl, for example, phenyl, naphthyl, anthracyl, etc.; alkaryl, for example, tolyl, xylyl, ethyl phenyl, etc., radicals; arylalkyl aryl, for example, phenylmethyl phenyl (C$_6$H$_5$CH$_2$C$_6$H$_4$—), phenylethyl phenyl, etc., radicals; hydroxyalkyl aryl for example, methylol phenyl, ethylol phenyl, methylol naphthyl, etc.; poly (hydroxyalkyl) aryl, for instance, dimethylol phenyl, trimethylol phenyl, trimethylol methyl phenyl, etc.; and hydroxy aryl radicals, for example, hydroxy phenyl, hydroxy biphenyl, dihydroxy phenyl, hydroxynaphthyl; polycyclic alcohols, sugars, hydroxy acids etc.

The amount of trialkylchlorosilane employed should be sufficient, on a molar basis, to react with at least one aryl hydroxy group. Thus, in the case of, for example, phenol or methylol phenol, 1 mol of trialkylchlorosilane should be employed as the minimum for each mol of the aryl hydroxy compound. It will, of course, be apparent that in order to cause the reaction whereby the trialkyl derivative goes to essential completion, an excess of the trialkylchlorosilane is preferably employed, e. g., from 1.1 to 3 or more mols thereof per mol of arylhydroxy group. The trialkylchlorosilane is preferably trimethylchlorosilane because of its lower boiling point and ease with which it can be removed by fractional distillation. Where more than one hydroxy group is present on the aryl nucleus, it is preferable though not essential to block off all such aryl hydroxy groups by using sufficient trialkylchlorosilane to effect reaction of such hydroxyl groups with the trialkylchlorosilane. Maximum purity is obtained when all the aryl hydroxyl groups are caused to react or be tied up. If aliphatic hydroxyl groups are present in the hydroxyaryl derivative, all such aliphatic hydroxyl groups should be blocked by using sufficient trialkylchlorosilane.

The reaction between the hydroxy aryl compound and the trialkylchlorosilane in the presence of the hydrogen chloride acceptor is generally effected with good results at room temperature, that is, at temperatures of the order of about 25 to 35° C. Since the reaction between the chlorosilane and the hydroxy aryl compound is accompanied by a rise in temperature, generally it is desirable to effect cooling of the reaction mixture so that in no case does the temperature exceed about 45 to 55° C. in order to prevent undesirable color formation or the formation of undesirable by-products. Generally, it is preferred to add the trialkylchlorosilane to a mixture of the hydroxy aryl compound and the hydrogen chloride acceptor and to stir vigorously while making the addition. The end of the reaction can generally be determined by noting when further addition of the trialkylchlorosilane does not cause a noticeable rise in the temperature of the reaction mixture.

After the reaction is completed, the hydrogen chloride salt of the hydrogen chloride acceptor and any other salts which may be formed during the reaction and any other solid matter, for that matter, are then filtered and the filtrate subjected to fractional distillation to obtain fractions, one of which, at least, will comprise the desired trialkylsilyl derivative of the hydroxy aryl compound. After the desired fraction has been isolated, this may be hydrolyzed to give the essentially pure desired hydroxy aryl compound by boiling the fraction, for example, in water and any desirable solvent which may be necessary to give a homogeneous solution from which the pure hydroxy aryl compound may be subsequently crystallized or otherwise separated. The particular steps in effecting hydrolysis of the trialkylsilyl derivative of the hydroxy aryl compound will, of course, be modified depending on the specific hydroxy aryl compound with which one is working. This will be apparent from the following examples which are given by the way of illustration and not by way of limitation. All parts are by weight.

EXAMPLE 1

Eighty-five (85) grams of impure p-phenyl phenol was dissolved in 50 ml. pyridine and 100 ml. benzene. While stirring the solution, 54.25 grams of trimethylchlorosilane was added. The pyridine HCl formed in the reaction was filtered off. The precipitate was rinsed with 50 ml. of benzene and the washings and filtrates combined and the benzene removed by distillation. The residue was transferred to a distilling flask where practically the entire product was distilled at 157–160°/14 mm. The product was a water-white, mobile liquid weighing 112 grams. This represented a yield of about 92.5% of the theoretical. Part of the product was dissolved in alcohol and 2 ml. of 1 N HCl was added. After heating for a few minutes the solution was diluted with sufficient water to give a slightly cloudy solution at the boiling point of the solution. Upon cooling the solution, clear snow-white crystals of a p-phenyl-phenol were obtained. The crystals possessed exceptional brilliance and purity. Melting point without crystallization was obtained at around 164–165° C. This checks almost exactly with the melting point of 164–165° C. for the same compound given by Huntress and Mulliken in their book "Identification of Pure Organic Compounds."

EXAMPLE 2

12.4 grams of impure saligenin

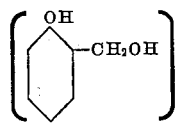

was disssolved in 20 ml. of pyridine and 50 ml. of benzene. About 22 grams of trimethylchlorosilane was added to the solution and the formed pyridine hydrogen chloride was filtered off. The benzene was removed from the filtrate by boiling the latter and the residue distilled to give a product weighing 21.5 grams and having a boiling point of 109–111° C./12–14 mm. This represented a yield of about 80%. Part of the product was boiled for several minutes with a solution of methanol and water. On cooling, the solution deposited snow-white crystals of saligenin melting at 86.5–87.5° C. which compared well with the melting point for the same compound of 86–87° C. given by Huntress and Mulliken in their book mentioned above.

This last work shows the ease with which phenol alcohols which are notoriously sensitive towards resinification as well as oxidation can be readily purified. The saligenin used was presumably a crystal-pure product, yet it had a cream-to-orange color and even repeated crystallization from several different solvents resulted in little improvement in color. Even the use of decolorizing charcoal had little effect on clearing up the color of the saligenin. However, by means of my process, all color was effectively removed to give a product which was white and crystalline in nature.

EXAMPLE 3

22 grams of catechol which was black due to impurities was dissolved in 35 ml. pyridine and 50 ml. benzene. To this solution was added 46 grams of trimethylchlorosilane. The pyridine HCl was filtered off and the benzene was then boiled off the filtrate. The residue was distilled to give a fraction boiling between 97–100° C./14 mm. which was a water-white oil. On hydrolysis of part of the product with a small amount of 1 N hydrogen chloride dissolved in methanol, a white crystalline product was obtained, thus showing that even a phenol as sensitive to oxidation as catechol can be purified by this procedure.

EXAMPLE 4

A methylol phenate solution was prepared by reacting 150 ml. of aqueous 37% formaldehyde with 1 mol. of potassium phenate. The reaction was carried out at 25–30° C. and was allowed to proceed for about 4 days. The reaction mixture was then dehydrated under vacuum (15–20 mm.) while the temperature was maintained for the most part at around 30–40° C. When the dehydration was complete, the residue was dissolved in 360 ml. of pyridine. While stirring rapidly and cooling, 580 ml. trimethylchlorosilane was added while at the same time maintaining the temperature below 60° C. during this entire operation. The pyridine HCl was filtered off and the crystals which appeared were rinsed with 100 ml. of benzene which was added to the filtrate. The benzene and excess pyridine were boiled off by heating the filtrate on a hot plate to a final temperature of about 145° C. The residue was distilled with the following results:

*Table I*

| Fraction | Temperature, ° C. | Pressure, mm. | Yield |
|---|---|---|---|
| I | { 40–95 <br> 95–100 | 27 <br> 12 | Few drops. <br> 10.7 grams. |
| II | { 100–135 <br> 135–160 | 12 <br> 12 | Few drops. <br> 64.7 grams. |
| III | 160–165 | 12 | 50.0 grams. |
| Residue | | | 58.0 grams. |

Fraction II was redistilled as shown in the following Table II to give the recited fractions.

*Table II*

| Fraction | Temperature, ° C. | Pressure, mm. | Yield, grams |
|---|---|---|---|
| II–A | 72–77 | 0.5–1.4 | 26.0 |
| II–B | 84–87 | 0.3–0.2 | 4.5 |
| II–C | 105–125 | 0.3 | 12.0 |
| II–D | 125–150 | 0.4 | 16.3 |

Part of fraction III above was redistilled to give the following results:

*Table III*

| Fraction | Temperature, ° C. | Pressure, mm. | Yield |
|---|---|---|---|
| III–A | 119–125 | 0.5–0.6 | 10.0 grams. |
| III–B | 125–129 | 0.5 | Trace. |
| III–C | 135–140 | 0.4–0.5 | 12.5 grams. |

Fraction II–A was hydrolyzed in the manner described in Example 2 to give snow-white crystals having a melting point of 115–117° C. which on recrystallization from a solution of alcohol and benzene melted at 117–118° C. This compound was shown by analysis to be p-hydroxy benzyl alcohol. This compound was extremely difficult to obtain from a phenolic reaction mixture and according to some workers has never been obtained in this manner.

Hydrolysis of fraction III-A with a solution of water and alcohol gave a snow-white, feathery, crystalline product having a melting point of 92.6–93.2° C. Further recrystallization from a solution of alcohol and benzene raised the melting point of the material to 93.5–93.8° C. This compound is believed to be the hitherto unknown 2,4-dimethylol phenol as evidenced by the fact that analysis thereof showed that it contained 62.23% carbon and 6.63% hydrogen as compared to a calculated value of 62.31% carbon and 6.49% hydrogen for the same compound. By treating the compound with dimethyl sulfate, there was obtained a product melting at 98–100° C. and showing no depression in melting point (M. P. 99–101° C.) when mixed with an authentic sample of 2,4-dimethylol anisole, M. P. 101–104° C.

EXAMPLE 5

In this example 24 grams of crude blood-red 4,4'-dihydroxydiphenyl methane was placed in a reaction vessel equipped with a stirrer, a reflux condenser and a dropping funnel. 19 grams pyridine and about 100 cc. benzene was added and while the solution was rapidly stirred, 26 grams of trimethylchlorosilane was slowly dropped in. Much heat was evolved and the mixture was allowed to reflux with stirring for several hours and thereafter permitted to cool to room temperature. The precipitate which formed was filtered off, washed several times with benzene and discarded. The filtrate was combined with the washings and was heated in an open beaker on a hot plate in a hood until the temperature of the residual oil was at 130° C. The oil was then flash-distilled in a distilling vessel under reduced pressure (about 30 mm.) with the major product coming over at about 200–210° C. At the end of the distillation a small amount of viscous oil left behind in the still-pot was discarded. The distillate was poured into approximately twice its volume of a 50% methanol-water solution in a beaker. The mixture was heated to reflux and maintained at reflux temperature for several hours to hydrolyze off the trimethylsilyl groups. Methanol was added from time to time to keep the mixture homogeneous. The ebullition temperature was allowed to rise to 90° C. for a short period of time and thereafter the beaker and its contents were allowed to cool slowly. The snow-white crystals which formed were filtered off and a second slightly pink crop was obtained by diluting the mother liquor with water. The melting points of the two crystalline fractions were 161–162° C. and 160–161° C., respectively. These melting points of the essentially pure diphenylol methane compare very favorably with the pure melting point of diphenylol methane disclosed in the literature.

EXAMPLE 6

This example illustrates the preparation of essentially pure methylol phenols including the preparation of methylol phenols which have heretofore been obtained only with the greatest difficulty. A mixture of methylol phenols was prepared by dissolving 282 grams of phenol in a solution containing 198 grams of 83% potassium hydroxide and 100 ml. water. The phenate solution was cooled to 40° C. and 500 grams of 36.3% formalin, cooled to 17° C. was added. The reaction mixture was kept at 25–35° C. for 48 hours. Approximately 300 ml. of water was removed by distillation at a pressure of about 15–20 mm. while the pot temperature was maintained below 50° C. For the most part, the temperature was kept well below this 50° C. The methylol phenate mixture obtained above was suspended in 1600 ml. dry pyridine and stirred vigorously while trimethylchlorosilane was slowly added until an excess was indicated. The end point was determined by noting when further addition of trimethylchlorosilane did not cause noticeable rise in the temperature of the reaction mixture. The chlorosilane was added at such a rate and with cooling so that the temperature of the reaction mixture in no case exceeded 55° C. and generally was kept well below 45° C. The pyridine hydrochloride and potassium chloride were filtered off, rinsed with benzene and then discarded. The filtrate and benzene washings were combined and benzene and excess pyridine were distilled off by heating to a pot temperature of 160° C. The residue was then fractionally distilled through a three-bulb Snyder column to give various fractions which are illustrated below in Table IV.

Table IV

| Fraction | Boiling Range | Pressure, mm. | Weight, grams | Percent Silicon |
|---|---|---|---|---|
| I | 35–80 | 20–34 | 18.7 | 12.7 |
| II | 80–90 | 19 | 26.8 | 21.1 |
| III | 90–140 | 15 | 79 | 21.7 |
| IV | 140–150 | 15 | 68 | 21.7 |
| V | 83–115 | 0.05 | 14.5 | 22.6 |
| VI | 115–125 | 0.05 | 143 | 23.2 |
| VII | 125–135 | 0.05 | 106 | 22.9 |
| VIII | 135–145 | 0.03–0.05 | 217 | 24.3 |
| IX | 145–148 | 0.03 | 24 | 25.5 |
| X | Residue | | 107 | 23.3 |

11 grams of fraction III was boiled several minutes with 2 ml. of water and sufficient alcohol to give a homogeneous solution. Benzene was then added and the excess water removed by distilling off the benzene-water-alcohol azeotrope. On cooling, snow-white crystals, M. P. 114–115° C., separated from the solution. The product was recrystallized from 3:1 benzene-alcohol, M. P. 119–120° C. The melting point reported for p-hydroxybenzyl alcohol is 121° C. The compound was shown to be para-hydroxybenzyl alcohol by comparison of its infra-red absorption spectrum with that for an authentic sample of the compound. The analysis also showed that this was the desired compound as evidenced by the fact that it was found to contain 67.96% carbon and 6.57% hydrogen as compared to the theoretical values of 67.73% carbon and 6.50% hydrogen.

Approximately 10 grams of fraction VI was hydrolyzed by boiling it with 3 grams of water in sufficient methanol to give a clear solution. After concentrating the solution to a fairly small volume, ethyl acetate was added and the solution boiled until free of water. It is essential during this operation that the solution be anhydrous; otherwise, the product will not crystallize. The boiling point of the solution can be used to indicate when the solution is dry. On cooling the solution, snow-white crystals, M. P. 91–2° C., were obtained. Upon recrystallization from ethyl acetate, crystals melting at 93–4° C. were obtained. Elemental analysis of the compound indicated that it was a di-(hydroxymethyl)phenol. Analysis showed it to contain 62.28% carbon and 6.89% hydrogen as compared to the theoretical values of 62.18% carbon and 6.52% hydrogen. The compound was shown to be the 2,4-isomer by conversion to the known 2,4-bis(hydroxymethyl)anisole by treatment with dimethyl sulfate in strong alkaline solution. The compound melted at 100–1° C. and showed no depression in melting point when mixed with an authentic sample of 2,4-bis(hydroxymethyl)anisole, M. P. 101° C.

Fraction VIII in an amount equal to about 25 grams was dissolved in acetone containing several grams of water. The solution was warmed for 10 minutes and then filtered through a bed of Drierite to remove the bulk of the unreacted water. The solution was concentrated at room temperature to a small volume whereupon crystals separated. The product was recrystallized from ethyl acetate giving snow-white crystals, M. P. 84° C. The elemental analysis of the compound indicated the compound was tris-(hydroxymethyl)phenol. Analysis showed it to contain 58.68% carbon and 6.54% hydrogen as compared to the theoretical values of 58.68% carbon and 6.57% hydrogen. This was confirmed by conversion of the compound to the known 2,4,6-tris(acetoxymethyl)-phenyl acetate by the action of acetic anhydride and pyridine. The ester boiled at 172–5° C./0.1 mm. Analysis of this composition showed that it contained 57.82% carbon and 5.91% hydrogen and had a saponification equivalent of about 89.9 as compared with the theoretical value of 57.45% carbon, 5.72% hydrogen and a saponification equivalent of 88.08. A sample of the compound was also converted to the known sodium tris-(hydroxymethyl)phenate by dissolving in alcohol and treating with a slight excess of alcoholic sodium hydroxide. Sodium tris-(hydroxymethyl)phenate precipitated from the alcohol solution as a dry white powder upon the addition of a little butanol. The precipitate was filtered off and dried. Its equivalent weight was determined by titrating a sample of known weight with standard 0.1 N hydrochloric acid. Analysis of this compound showed it to have an equivalent weight of 204.3 as compared to the calculated equivalent weight of 206.18.

It will, of course, be apparent to those skilled in the art that other hydroxy aryl compounds as, for example, other sugars, vitamins with alcoholic groups, phenol alcohols, hydroxy acids, other phenols such as pyrocatechol, pyrogallol, certain sterols and hormones containing phenolic groups which are readily oxidized, particularly at high temperatures, can be substituted for the various hydroxy aryl compounds in the examples mentioned above. In addition it will also be apparent that instead of trimethylchlorosilane employed above other trialkylchlorosilanes, many examples of which have been disclosed previously, may be used in place thereof. The proportion of ingredients may also be varied within wide limits, depending upon the particular hydroxy aryl compound employed, the trialkylchlorosilane employed, etc.

Various other hydrogen chloride acceptors, many examples of which have also been given above, may be employed in place of the pyridine used in the foregoing examples. In addition, it will also be apparent that various solvents other than those used in the examples above may be employed, depending, of course, on the type of reactants used, the type of product which is anticipated, etc.

By means of my process I am able to isolate many hydroxy compounds which either do not lend themselves readily to fractional distillation or because of sensitivity to heat or oxidation cannot be purified by simple fractional distillation. The process herein described is particularly suitable for isolating and separating in the essentially pure state compounds such as diphenylol methanes which while not seriously affected by oxidation, boil at such high temperatures that even at reduced pressures thermal decomposition may occur. My process obviates the necessity of using such procedures as molecular distillation and hard to get equipment which are frequently employed for the purification of heat-sensitive compounds.

The essentially pure hydroxy aryl compound obtained in accordance with my process may be used as intermediates in the preparation of other compositions and may be use as pure pharmaceuticals for various purposes as, for example, the vitamins, the sterols, the hormones, etc., where purity is an essential requirement of the material.

What I claim as new and desire to secure by Letters Patent of the United States is:

1. The process for separating in substantially pure and uncontaminated state an impure hydroxylated aryl compound corresponding to the general formula R—OH where R is a member selected from the class consisting of aryl, alkaryl, arylalkylaryl, hydroxyalkyl aryl, poly(hydroxyalkyl) aryl, and hydroxyaryl radicals, which process comprises (1) effecting reaction between (a) a composition consisting essentially of the above-described hydroxylated aryl compound in the impure state as the essential ingredient with (b) a chlorosilane as the sole silicon-containing compound in the mixture of reactants having the formula R'$_3$SiCl where R' is a lower alkyl radical, said reaction being conducted at a temperature not exceeding 55° C. and in the presence of a tertiary amine, there being present from 1.1 to 3.3 mols of the chlorosilane per mol of each arylhydroxy group on the hydroxylated aryl compound, (2) removing the salt formed from the reaction between the tertiary amine and the evolved hydrogen chloride, and (3) hydrolyzing the silicon reaction product to obtain the substantially pure hydroxylated aryl compound.

2. The process for separating in substantially pure state para-phenyl phenol which comprises (1) effecting reaction between (a) a composition consisting essentially of the para-phenyl phenol in the impure state as the essential ingredient and (b) trimethylchlorosilane as the sole silicon-containing compound in the mixture of reactants, said reaction being conducted at a temperature not exceeding 55° C. and in the presence of a tertiary amine, there being present from 1.1 to 3.3 mols of the chlorosilane per mol of the para-phenyl phenol, (2) removing the salt formed from the reaction of the liberated hydrogen chloride and tertiary amine, and (3) hydrolyzing the silicon reaction product to obtain substantially pure para-phenyl phenol.

3. The process for obtaining substantially pure saligenin which comprises (1) effecting reaction between (a) a composition consisting essentially of impure saligenin and (b) trimethylchlorosilane as the sole silicon-containing compound in the mixture of reactants, said reaction being conducted at a temperature not exceeding 55° C. and in the presence of a tertiary amine, there being present from 1.1 to 3.3 mols of the chlorosilane per mol of the arylhydroxy group in the saligenin, (2) removing the salt formed from the reaction of the tertiary amine and the liberated hydrogen chloride, and (3) hydrolyzing the silicon reaction product to obtain substantially pure saligenin.

4. The process for obtaining substantially pure catechol which comprises (1) effecting reaction between (a) a composition consisting essentially of impure catechol and (b) trimethylchlorosilane as the sole silicon-containing compound in the mixture of reactants, said reaction being conducted at a temperature not exceeding 55° C. in the presence of a tertiary amine, there being present from 1.1 to 3.3 mols of the chlorosilane per mol of each of the arylhydroxy groups on the catechol, (2) removing the formed tertiary amine hydrochloride salt, and (3) hydrolyzing the silicon reaction product to obtain substantially pure catechol.

5. The process for obtaining a substantially pure mixture consisting of various methylol phenols, which process comprises (1) effecting reaction between (a) a composition consisting essentially of the above-described methylol phenols in the impure state as the essential ingredient with (b) trimethylchlorosilane as the sole silicon-containing compound in the mixture of reactants, said reaction being conducted at a temperature not exceeding 55° C. in the presence of a tertiary amine, there being present from 1.1 to 3.3 mols of the chlorosilane per mol of each arylhydroxy group on the methylol phenol, (2) removing the formed tertiary amine hydrochloride salt, and (3) hydrolyzing the silicon reaction product to obtain a mixture comprising substantially pure methylol phenols.

6. The process for obtaining substantially pure 4,4'-dihydroxydiphenyl methane which comprises (1) effecting reaction between (a) a composition consisting essentially of impure 4,4',-dihydroxydiphenyl methane with (b) trimethylchlorosilane as the sole silicon-containing compound in the mixture of reactants, said reaction being conducted at a temperature not exceeding 55° C. and in the presence of a tertiary amine hydrohalide acceptor, there being present from 1.1 to 3.3 mols of the chlorosilane per mol of each arylhydroxy group on the 4,4'-dihydroxydiphenyl methane, (2) removing the formed tertiary amine hydrochloride salt, and (3) hydrolyzing the silicon reaction product to obtain substantially pure 4,4'-dihydroxydiphenyl methane.

References Cited in the file of this patent

UNITED STATES PATENTS

| | | |
|---|---|---|
| 1,549,779 | MacMullin et al. | Aug. 18, 1925 |
| 1,862,000 | Britton et al. | June 7, 1932 |
| 1,942,838 | Semon | Jan. 9, 1934 |
| 1,980,901 | Bentley et al. | Nov. 18, 1934 |
| 2,060,715 | Arvin | Nov. 10, 1936 |
| 2,156,402 | Prahl | May 2, 1939 |
| 2,260,336 | Prescott et al. | Oct. 28, 1941 |
| 2,485,366 | DiGiorgio et al. | Oct. 18, 1949 |
| 2,618,665 | Hess et al. | Nov. 18, 1952 |